(12) United States Patent
Hu et al.

(10) Patent No.: US 10,296,878 B1
(45) Date of Patent: May 21, 2019

(54) PLATFORM FOR PROVIDING GENERIC E-CONTENT

(75) Inventors: Luhui Hu, Bothell, WA (US); Aditya Balwant Pande, Seattle, WA (US); Oleksandr Y. Berezhnyy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 798 days.

(21) Appl. No.: 13/171,160

(22) Filed: Jun. 28, 2011

(51) Int. Cl.
G06F 9/445 (2018.01)
G06Q 20/12 (2012.01)

(52) U.S. Cl.
CPC ..... *G06Q 20/1235* (2013.01); *G06F 9/44526* (2013.01)

(58) Field of Classification Search
USPC .......................................................... 705/51
See application file for complete search history.

(56) References Cited

U.S. PATENT DOCUMENTS

| | | | |
|---|---|---|---|
| 4,656,624 A | 4/1987 | Collins et al. | |
| 5,732,216 A | 3/1998 | Logan et al. | |
| 5,892,900 A * | 4/1999 | Ginter et al. | 726/26 |
| 5,925,081 A | 7/1999 | Hawkins et al. | |
| 6,233,682 B1 | 5/2001 | Fritsch | |
| 6,704,733 B2 | 3/2004 | Clark et al. | |
| 6,873,840 B1 | 3/2005 | von Alten | |
| 6,985,885 B1 | 1/2006 | Goldberg et al. | |
| 7,167,841 B2 * | 1/2007 | Hatano | G06Q 30/06 705/56 |
| 7,249,107 B2 | 7/2007 | Yaacovi | |
| 7,401,286 B1 | 7/2008 | Hendricks et al. | |

(Continued)

FOREIGN PATENT DOCUMENTS

| | | |
|---|---|---|
| CA | 2851926 | 4/2005 |
| CN | 101311928 | 11/2008 |

(Continued)

OTHER PUBLICATIONS

Microsoft Computer Dictionary Fifth edition 2002.*

(Continued)

*Primary Examiner* — Zeshan Qayyum
(74) *Attorney, Agent, or Firm* — Lee & Hayes, P.C.

(57) ABSTRACT

A platform for obtaining digital items provides consumers access to digital item from multiple sources such as other consumers, libraries, rental services, and stores. The platform may be implemented as a cloud-based system accessible over the Internet. The platform transforms digital items into different formats when needed for compatibility with a computing device of the end consumer and transfers digital rights management (DRM) restrictions across different DRM schema. Consumers may store personal information in association with a digital item for later re-association with other copies of the same digital item. Consumers may also comment on a digital item and the platform may make those comments available to other consumers that have accessed the same digital item. The platform may also mediate instant messaging between consumers that are both associated with the same digital item. Computing devices of the consumers may receive widgets from the platform that provide additional functionality.

18 Claims, 8 Drawing Sheets

(56) References Cited

U.S. PATENT DOCUMENTS

| | | | |
|---|---|---|---|
| 7,416,489 | B2 | 8/2008 | Smith, III |
| 7,546,524 | B1 | 6/2009 | Bryar et al. |
| 7,756,753 | B1 | 7/2010 | McFarland |
| 8,037,541 | B2* | 10/2011 | Montague .............. G06F 21/10 380/200 |
| 8,073,733 | B1 | 12/2011 | Caland |
| 8,132,094 | B1 | 3/2012 | Bryar et al. |
| 8,371,855 | B1 | 2/2013 | Gayles et al. |
| 2001/0033659 | A1 | 10/2001 | Eisenberg |
| 2002/0091634 | A1 | 7/2002 | Eubanks |
| 2002/0169854 | A1* | 11/2002 | Tarnoff ............. G06F 17/30864 709/219 |
| 2003/0018582 | A1 | 1/2003 | Yaacovi |
| 2003/0154160 | A1* | 8/2003 | Arndt .................... G06Q 40/00 705/37 |
| 2004/0111391 | A1 | 6/2004 | Fujita et al. |
| 2004/0138983 | A1 | 7/2004 | Nishimaki |
| 2004/0174980 | A1 | 9/2004 | Knott et al. |
| 2004/0193680 | A1 | 9/2004 | Gibbs et al. |
| 2004/0199545 | A1 | 10/2004 | Wagner et al. |
| 2004/0215554 | A1 | 10/2004 | Kemper et al. |
| 2004/0268418 | A1 | 12/2004 | Gray et al. |
| 2005/0004837 | A1 | 1/2005 | Sweeney et al. |
| 2005/0021750 | A1 | 1/2005 | Abrams |
| 2005/0033642 | A1 | 2/2005 | Mothwurf |
| 2005/0256866 | A1 | 11/2005 | Lu et al. |
| 2005/0289032 | A1 | 12/2005 | Hoblit |
| 2006/0129780 | A1 | 6/2006 | Dunshea et al. |
| 2006/0143134 | A1 | 6/2006 | So et al. |
| 2006/0149572 | A1* | 7/2006 | Auzins ................. G06Q 20/203 705/22 |
| 2006/0178905 | A1 | 8/2006 | Ayers et al. |
| 2006/0179129 | A1 | 8/2006 | Clayton et al. |
| 2006/0271460 | A1 | 11/2006 | Hanif |
| 2006/0282304 | A1 | 12/2006 | Bedard et al. |
| 2007/0019019 | A1 | 1/2007 | Yoshikawa et al. |
| 2007/0061704 | A1 | 3/2007 | Simova et al. |
| 2007/0162502 | A1 | 7/2007 | Thomas et al. |
| 2007/0198426 | A1 | 8/2007 | Yates |
| 2007/0201701 | A1 | 8/2007 | Kudelski |
| 2007/0201702 | A1 | 8/2007 | Hendricks et al. |
| 2007/0276817 | A1 | 11/2007 | Massonnie et al. |
| 2007/0288107 | A1 | 12/2007 | Fernandez-Ivern et al. |
| 2008/0010372 | A1 | 1/2008 | Khedouri et al. |
| 2008/0046976 | A1 | 2/2008 | Zuckerberg |
| 2008/0065514 | A1 | 3/2008 | Eaton |
| 2008/0104624 | A1 | 5/2008 | Narasimhan et al. |
| 2008/0148069 | A1 | 6/2008 | Tsuria et al. |
| 2008/0189367 | A1 | 8/2008 | Okumura |
| 2008/0201225 | A1 | 8/2008 | Maharajh et al. |
| 2008/0201376 | A1 | 8/2008 | Khedouri et al. |
| 2008/0293450 | A1* | 11/2008 | Ryan ................. G06F 17/30613 455/556.2 |
| 2008/0301039 | A1 | 12/2008 | Dawson et al. |
| 2009/0024925 | A1 | 1/2009 | Stevens |
| 2009/0052778 | A1 | 2/2009 | Edgecomb et al. |
| 2009/0210291 | A1 | 8/2009 | Safar |
| 2009/0260067 | A1 | 10/2009 | Racabi |
| 2009/0282438 | A1 | 11/2009 | White |
| 2009/0319288 | A1 | 12/2009 | Slaney et al. |
| 2009/0323640 | A1 | 12/2009 | Chakrabarti et al. |
| 2010/0086130 | A1 | 4/2010 | Wang et al. |
| 2010/0088314 | A1 | 4/2010 | Kuang |
| 2010/0095201 | A1 | 4/2010 | Sawada |
| 2010/0106659 | A1 | 4/2010 | Stefik et al. |
| 2010/0114820 | A1 | 5/2010 | Mathews |
| 2010/0131385 | A1 | 5/2010 | Harrang et al. |
| 2010/0138867 | A1 | 6/2010 | Wong et al. |
| 2010/0217811 | A1 | 8/2010 | Kay |
| 2010/0262515 | A1 | 10/2010 | Brewer |
| 2010/0325155 | A1* | 12/2010 | Skinner ............. G06F 17/30017 707/770 |
| 2011/0131094 | A1 | 6/2011 | Chuang et al. |
| 2011/0166928 | A1 | 7/2011 | Robinson et al. |
| 2012/0066127 | A1 | 3/2012 | Kingston et al. |

FOREIGN PATENT DOCUMENTS

| | | |
|---|---|---|
| JP | 2002037356 | 2/2002 |
| JP | 2002540490 | 11/2002 |
| JP | 2006178547 | 7/2006 |
| JP | 2007305083 | 11/2007 |
| JP | 2008512751 | 4/2008 |
| JP | 2008525864 | 7/2008 |
| JP | 2008217048 | 9/2008 |
| KR | 20010069620 | 7/2001 |
| WO | WO2002037356 | 5/2002 |
| WO | WO2006029054 | 3/2006 |

OTHER PUBLICATIONS

Office action for U.S. Appl. No. 13/075,013, dated Feb. 1, 2013, Anbalagan et al., "Mediated Lending of Digital Items", 41 pages.

Office action for U.S. Appl. No. 13/075,054, dated Jan. 25, 2013, Anbalagan et al., "Identification of Borrowers for Digital Items", 13 pages.

Office action for U.S. Appl. No. 13/075,036, dated Feb. 21, 2013, Inventor #1, "Lending Digital Items to Identified Recipients", 53 pages.

Office action for U.S. Appl. No. 12/792,518, dated Feb. 7, 2013, Freed et al., "Referring, Lending, and Reselling of Digital Items", 16 pages.

PCT Search Report dated Jun. 20, 2012 for PCT application No. PCT/US12/30982, 8 pages.

Office action for U.S. Appl. No. 13/075,036, dated Jun. 19, 2013, Anbalagan et al., "Lending Digital Items to Identified Recipients", 45 pages.

Liu, et al., "Digital Rights Management for Content Distribution", Australasian Information Security Workshop, Dec. 2003, Adelaide, Australia, Retrieved online on Aug. 15, 2011 at http://portal.acm.org/citation.cfm?id=827987.827994, entire document.

PCT Search Report dated Aug. 26, 2011 for PCT application No. PCT/US11/38696, 8 pages.

Unlu, et al., "Functional Reference Model for Digital Rights Management Systems", Proceedings of the 15th ITS Conference, Dec. 2004, Retrieved online on Aug. 15, 2011 at http://userpage.fu-berlin.de/~jmueller/its/conf/berlin04/Papers/%DCnt%FC.pdf, entire document.

Final Office Action for U.S. Appl. No. 13/075,054, dated Sep. 25, 2013, Karthik G. Angalagan, "Identification of Borrowers for Digital Items", 18 pages.

Office Action for U.S. Appl. No. 12/792,518, dated Oct. 2, 2013, Ian W. Freed, "Referring, Lending, and Reselling of Digital Items", 19 pages.

Office action for U.S. Appl. No. 12/792,518 , dated Sep. 20, 2012, Freed et al., "Referring, Lending, and Reselling of Digital Items", 17 pages.

"Book Lending, FAQ", retrieved Mar. 19, 2014 from http://web.archive.org/web/20110217150957/http://www.booklending.com/faq.htm, 3 pgs.

Final Office Action for U.S. Appl. No. 13/075,054, dated Feb. 5, 2014, Karthik G. Angalagan, "Identification of Borrowers for Digital Items", 17 pages.

Translated Japanese Office Action dated Jan. 7, 2014 for Japanese patent application No. 2013-513285, a counterpart foreign application of U.S. Appl. No. 12/792,518, 12 pages.

"Lendle: Kindle Book Sharing", Frequently Asked Questions, retrieved Mar. 19, 2014 from http://web.archive.org/web/20110218055902/http://lendle.me/faq/ , 3 pgs.

Final Office Action for U.S. Appl. No. 13/075,036, dated Dec. 4, 2013, Karthik G. Anbalagan, "Lending Digital Items to Identified Recipients", 36 pages.

Extended European Search Report dated Mar. 9, 2015 for European Patent Application No. 11790312.0, 6 pages.

(56) References Cited

OTHER PUBLICATIONS

Final Office Action for U.S. Appl. No. 12/792,518, dated Mar. 20, 2015, Ian W. Freed, "Referring, Lending, and Reselling of Digital Items", 24 pages.
Translated Korean Office Action dated May 2, 2014 for Korean patent application No. 10-2012-7031460, a counterpart foreign application of U.S. Appl. No. 12/792,518, 7 pages.
Office action for U.S. Appl. No. 12/792,518, dated Jul. 10, 2014, Freed et al., "Referring, Lending, and Reselling of Digital Items", 19 pages.
Canadian Office Action dated Jul. 29, 2015 for Canadian patent application No. 2801063, a counterpart foreign application of U.S. Appl. No. 12/792,518, 5 pages.
Office Action for U.S. Appl. No. 14/317,570, dated Jul. 7, 2015, Karthik G. Anbalagan, "Lending Digital Items to Identified Recipients", 30 pages.
Translated Korean Office Action dated Jan. 12, 2015 for Korean patent application No. 10-2012-7031460, a counterpart foreign application of U.S. Appl. No. 12/792,518, 8 pages.
Chinese Office Action dated May 6, 2015 for Chinese patent application No. 201180027431.1, a counterpart foreign application of U.S. Appl. No. 12/792,518, 7 pages.
Canadian Office Action dated Oct. 27, 2014 for Canadian patent application No. 2,801,063, a counterpart foreign application of U.S. Appl. No. 12/792,518, 4 pages.
Translated Japanese Office Action dated Sep. 24, 2014 for Japanese patent application No. 2013-513285, a counterpart foreign application of U.S. Appl. No. 12/792,518, 6 pages.
Translated Chinese Office Action dated Mar. 16, 2016 for Chinese patent application No. 201180027431.1, a counterpart foreign application of U.S. Appl. No. 12/792,518, 22 pages.
European Office Action dated Nov. 12, 2015 for European patent application No. 11790312.0, a counterpart foreign application of U.S. Appl. No. 12/792,518, 8 pages.
Office action for U.S. Appl. No. 13/075,054, dated Jan. 4, 2016, Anbalagan et al., "Identification of Borrowers for Digital Items", 22 pages.
Office action for U.S. Appl. No. 14/317,570, dated Dec. 18, 2015, Anbalagan et al., "Lending Digital Items to Identified Recipients", 24 pages.
Office action for U.S. Appl. No. 12/792,518, dated Apr. 8, 2016, Freed et al., "Referring, Lending, and Reselling of Digital Items", 24 pages.
Non-Final Office action for U.S. Appl. No. 12/792,518, dated Sep. 16, 2015, Freed et al., "Referring, Lending, and Reselling of Digital Items", 19 pages.
Canadian Office Action dated Jun. 26, 2018 for Canadian Patent Application No. 2801063, a counterpart foreign application of U.S. Appl. No. 12/792,518, 3 pages.
Canadian Office Action dated Jul. 12, 2017 for Canadian patent application No. 2801063, a counterpart foreign application of U.S. Appl. No. 12/792,518, 4 pages.
Canadian Office Action dated Sep. 8, 2016 for Canadian Patent Application No. 2801063, a counterpart foreign application of U.S. Appl. No. 12/792,518, 4 pages.
Chinese Office dated Dec. 27, 2016 for Chinese Patent Application No. 201180027431.1, a counterpart foreign application of U.S. Appl. No. 12/792,518, 8 pgs.
Chinese Office dated Jul. 6, 2017 for Chinese Patent Application No. 201180027431.1, a counterpart foreign application of U.S. Appl. No. 12/792,518, 11 pgs.
Translated Chinese Office dated Aug. 2, 2016 for Chinese patent application No. 201180027431.1, a counterpart foreign application of U.S. Appl. No. 12/792,518, 7 pages.
Office action for U.S. Appl. No. 14/317,570, dated Dec. 19, 2016, Anbalagan et al., "Lending Digital Items to Identified Recipients", 31 pages.
Office Action for U.S. Appl. No. 13/075,054, dated Feb. 26, 2018, Anbalagan, "Identification of Borrowers for Digital Items", 24 pages.
Office action for U.S. Appl. No. 14/317,570, dated Apr. 10, 2017, Anbalagan et al., "Lending Digital Items to Identified Recipients", 7 pages.
Office action for U.S. Appl. No. 13/075,054, dated Aug. 11, 2017, Anbalagan et al., "Identification of Borrowers for Digital Items", 25 pages.
Office action for U.S. Appl. No. 14/317,570, dated Aug. 19, 2016, Anbalagan et al., "Lending Digital Items to Identified Recipients", 29 pages.
Office Action for U.S. Appl. No. 13/075,054, dated Aug. 26, 2016, Anbalagan et al., "Identification of Borrowers for Digital Items", 24 pages.
The Indian Office Action dated Dec. 6, 2018 for Indian patent application No. 9811/DELNP/2012, a counterpart foreign application of U.S. Appl. No. 12/792,518, 8 pages.

* cited by examiner

PLATFORM FOR PROVIDING GENERIC E-CONTENT

RELATED APPLICATION

This application is related to the U.S. patent application Ser. No. 13/075,054 filed on Mar. 29, 2011, entitled "Identification of Borrowers for Digital Items" which is hereby incorporated in its entirety by reference herein.

BACKGROUND

A large and growing population of people enjoys entertainment through consumption of digital content items, such as music, movies, images, books, and other types of digital items. Many people today consume digital items on a wide variety of electronic devices. Among these electronic devices are personal computers, electronic book readers, cellular telephones, personal digital assistants (PDAs), portable media players, tablet computers, netbooks, and the like. Many formats for digital items are proprietary and are compatible only with a limited set of electronic devices.

More and more content is made available in digital form and digital items are available from an increasing number of sources. The multiple sources of digital items may offer differing pricing, different levels of customer service, as well as different formats of digital items including different types of digital rights (DRM) management. The plurality of sources for digital items combined with variation in formats and DRM compatibility may provide consternation rather than convenience to consumers. This excess complexity could cause some consumers to prefer conventional content items such as regular books over digital content items like electronic books. Systems and techniques that allow consumers to conveniently access digital items may increase the adoption of digital items and increase consumer satisfaction with digital items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6b is a continuation of the flow diagram from FIG. 6a.

DETAILED DESCRIPTION

This disclosure describes various architectures and techniques in which digital items, such as electronic books (or "eBooks"), may be obtained through a unified distribution platform from multiple sources. The digital items may be manifest in many different ways including, for example, as text-based items, audio items, video items, multimedia items, graphical items, and so forth. The architectures provide a functional environment to permit transfer of digital items, as well as association of personal and/or public data with a digital item. As one scenario, a user may access a digital item provisioning platform to search for a digital item and receive multiple options for receiving the digital item in a format that is compatible with the user's digital item consumption device (e.g., music player, eBook reader, mobile phone, etc.).

The unified distribution platform may function as a generic platform or system where users of devices for consuming digital item can obtain their desired digital items via a unified channel rather than by accessing multiple disparate channels. Consider the recent boom of eBooks, more and more eBook devices are becoming available in the market, and e-content providers are becoming more various. It is possible to acquire eBooks by purchasing one from an eBook store, borrowing from a rental service, checking one out from an eBook library, trading with another person through a lending service, etc. Additionally, publishers may only release eBooks (or other digital items) with Digital Rights Management (DRM) that may be intended to prevent copying but can also prevent users from reading eBooks on devices that are not compatible with a particular DRM schema. However, the large number of options and various prices can create a dilemma for users that desire convenience and low cost.

Through a generic platform or system, users can obtain digital items such as eBooks via a single channel and read (or use) on their devices without being limited by device compatibility issues or incompatible DRM restrictions. This single channel system may also allow a recipient of a digital item to annotate or "markup" the digital item with comments, notes, etc. Some of the annotations may be private and for viewing only by the user himself or herself. Other comments or reviews may be publicly shared with users that are interested in the same digital item.

The terms "electronic book" and/or "eBook," as used herein, include electronic or digital representations of printed works (or portions of printed works), as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, concepts described herein are also applicable to other types of digital content items, such as music, audio books, video, and other content items that people watch, listens to, consume, or otherwise experience.

Digital items, like eBooks, are one form of a common work. The common work may, for example, represent the text of the book regardless of the format. For example, the same common work may be the basis for an eBook, a paperback book, a hardcover book, and an audio book. Similarly, a common work of a software program may exist in Windows®, Mac OS®, Linux, iOS, and/or Android™ versions.

A rights holder may have rights such as a copyright in the common work, and multiple copies of that work may be owned by various end users. If the work is manifest in digital form (e.g., eBook), digital rights management (DRM) or other technological features may restrict copying and lending of the digital copy of the common work. Thus, rights holders may be reluctant to allow a common work to be translated into different versions without maintaining equivalent restrictions enforced by DRM. However, with proper safeguards, it may be possible for an end user to lend or borrow a digital copy of a common work even if the lending/borrowing is implemented in part by making an additional copy of the common work.

The "rights holders" may include at least an author and/or a publisher. In general, a rights holder may be any person or entity that holds or has rights to reproduce, distribute, import, export, create derivatives, perform or display publicly, sell or transmit the content. In some instances, there may be more than one rights holder for the content (e.g., a publisher may have rights to distribute the content in certain countries, while the author retains the rights to distribute the content in other countries; or publisher A may have the rights to distribute a book in printed form and publisher B may have the rights to distribute a book in eBook form). Examples of rights holders for various types of digital content include, but are not limited to, authors, publishers, music labels, movie studios, artists, songwriters, performers, heirs, and delegates.

Illustrative Architecture

Figure 1:
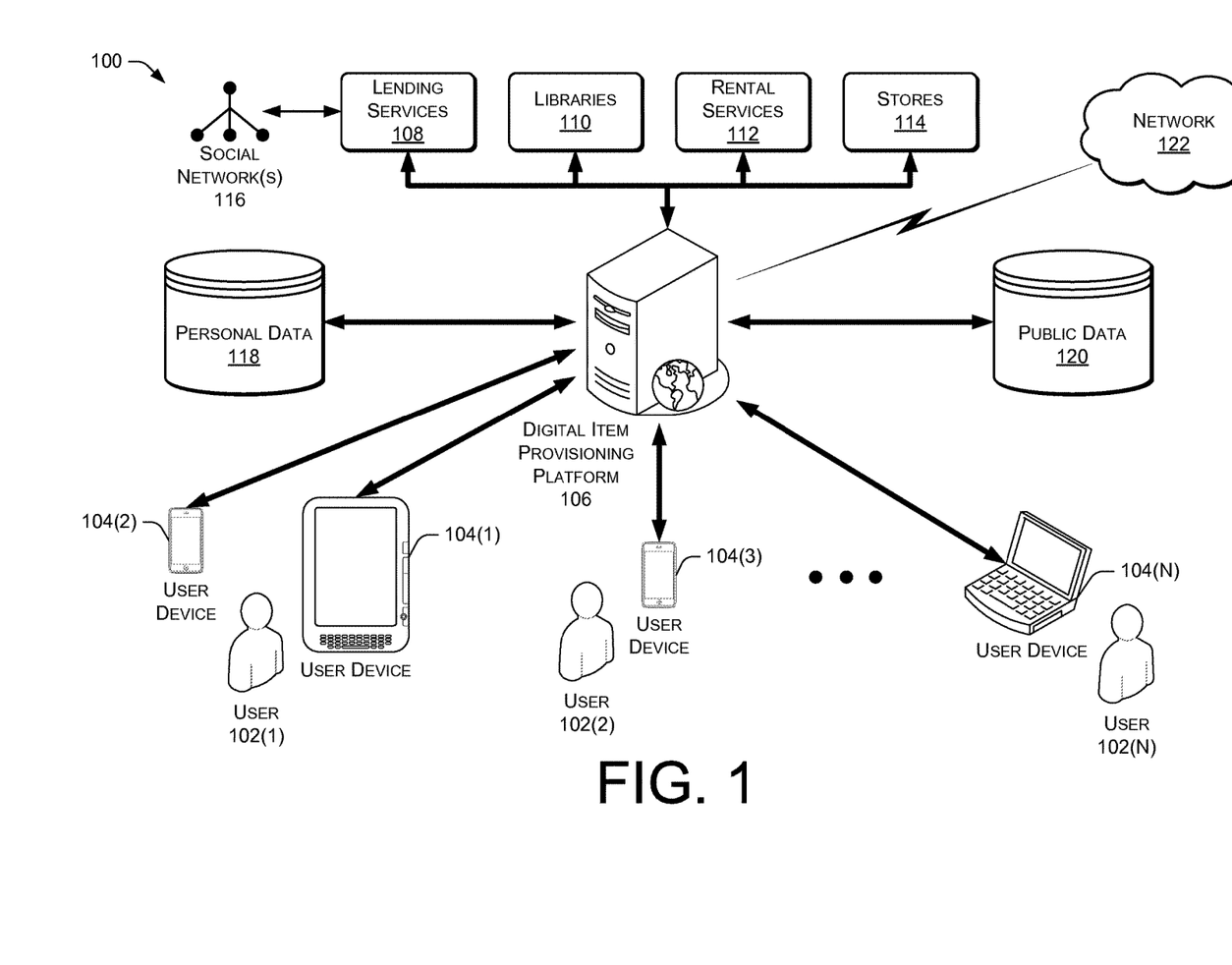
FIG. 1 illustrates an architecture in which multiple users may receive digital items from multiple sources.

FIG. 1 shows an illustrative architecture 100 for providing users access to digital items from a variety of sources. The architecture 100 may include 1-N users 102 shown here as user 102(1), user 102(2), and user 102(N). Each of the users may interact with one or more user devices 104(1)-(N) for consuming the digital items and communicating with a digital item provisioning platform 106. Representative user devices 104 are illustrated as including a dedicated eBook reader device 104(1), portable multi-function communication devices 104(2) and 104(3), and a notebook computer 104(N). Each of the user computing devices 104(1)-(N) may be implemented with appropriate applications to render eBooks, play audio files, play videos, or otherwise enable the respective users 102(1)-(N) to consume the digital items.

The digital item provisioning platform 106 may obtain digital items from multiple sources such as a digital item lending service 108, a library of digital items 110, a rental service 112, a store 114 selling digital items, and the like. The users 102 may subscribe to an e-content community and receive access to lending services 108 provided by that e-content community. The users in this e-content community may search for digital items owned by other members of the e-content community and exchange digital items with the other users. In some implementations, the lending services 108 act as lending and borrowing "matchmakers" in exchange for payment of a subscription or membership fee. The lending services 108 may also obtain information from one or more social networks 116 in order to identify other users that may be willing to lend digital items to or borrow digital items from the user 102 because of a relationship indicated by one of the social networks 116.

The libraries 110 may include public, university, or municipal libraries that lend digital items as well as convention content items. The libraries 110 may have a membership system so that only members are allowed to borrow a digital item from the library. Membership may be free and may be based on any factors commonly used for determining eligibility for library membership (e.g., residence, enrollment status, etc.). The libraries 110 may provide access to a digital item for limited time periods.

The rental services 112 may also provide temporary access to a digital item in exchange for a rental fee. The rental fee may vary based the length of time that a digital item is borrowed and on the type of digital item.

Purchase channels, such as digital item stores 114, provide another way to obtain a digital item. Purchasing a digital item from one of the stores 114 may be the most expensive way to acquire the digital item, but unlike the other channels, the user 102 may be able to keep the purchased digital item.

The digital item provisioning platform 106 may include a search mechanism that identifies digital items available from the lending services 108, the libraries 110, the rental services 112, and/or the stores 114. The digital item provisioning platform 106 may serve a proxy for accessing any of the distribution channels. Thus, rather than looking across multiple free and/or paid content providers to locate a digital item, the users 102 may access digital items from a variety of sources simply by interacting with the digital item provisioning platform 106.

The architecture 100 may also include personal data storage 118. The personal data storage 118 may be a cloud-based storage service. Each user 102 may have his or her account that is associated with data in the personal data storage 118. The data may also be associated with specific portions of digital items as well as with the user 102. Annotations, bookmarks, personal comments, and the like that are created by a user 102 while consuming a content item may be stored in the personal data storage 118 in association with the user that made those annotations (e.g., stored as part of a user account, linked to a user ID, etc.). Annotations may include a highlight of a passage of text and a note (e.g., similar to margin notes in a paper book) that includes text entered by the user 102. The annotations may be associated with a specified portion of a digital item such as page 201 or paragraph 73 of a text document or 17 minutes 15 seconds into a video document. Thus, annotations made to a borrowed digital item are retained by the user when the digital item is returned.

Data stored in the personal data storage 118 may persist even when the user 102 that created the data (e.g., annotation) no longer has access to the digital item. However, when the user 102 later obtains a digital item based on the same common work, (e.g., another copy of the same eBook) the information may be automatically re-associated with the digital item. For example, the user 102 can still see his or her bookmarks in a purchased copy of an eBook that he or she initially obtained, and then bookmarked, from a lending service 108.

Since the personal data storage 118 may be implemented as a cloud-based database service, the users 102 may switch between different user devices 104 without losing their personal data or needing to transfer their data to local storage on a new device 104. The user 102(1) may also switch between user devices 104(1) and 104(2) while consuming a digital item and access his or her personal data from both devices 104(1) and 104(2).

The architecture 100 may also include a public data storage 120 that stores comments, reviews, and the like related to a digital item. The comments may be generated by one of the users 102 and have access permissions specified by the user. For example, the user 102 can setup a reading user group and give other members of the reading user group access permission for comments related to the digital item. A comment may be related to the digital item as a whole without a specific association to a portion of the digital item like an annotation. A user 102 may also generate a review, rating, ranking, etc. of a digital item and make that review, rating, or ranking publically available to other users 102 in the architecture 100. The public data storage 120 may be implemented as a cloud-based storage service that provides similar portability and permanence as provided by cloud-based storage of the personal data 118.

In addition to sharing comments and reviews through the public data storage 120, the users 102 may establish an expiration date or max number of times that other users 102 access a given piece of public data. The limitations specified by this "lifetime control" mechanism may also be stored in the public data storage 120. These limits can help prevent a comment or review from becoming stale. The limits may also keep a given digital item from becoming cluttered with many old comments and/or reviews.

The digital item provisioning platform 106 may be connected to a network 122. The network 122 is representative of any one or combination of multiple different types of networks, such as the Internet, cable networks, cellular networks, wireless networks (e.g., Wi-Fi, Bluetooth, etc.) and wired networks. Any of the other devices or entities shown in the architecture 100 may also be able to access the network 122. Accessing the network 122 may allow the digital item provisioning platform 106 to exchange information with social networks 116 such as by allowing a user 102 to share a comment about a digital item with social network friends, followers, etc.

Illustrative Computing Devices

Figure 2:
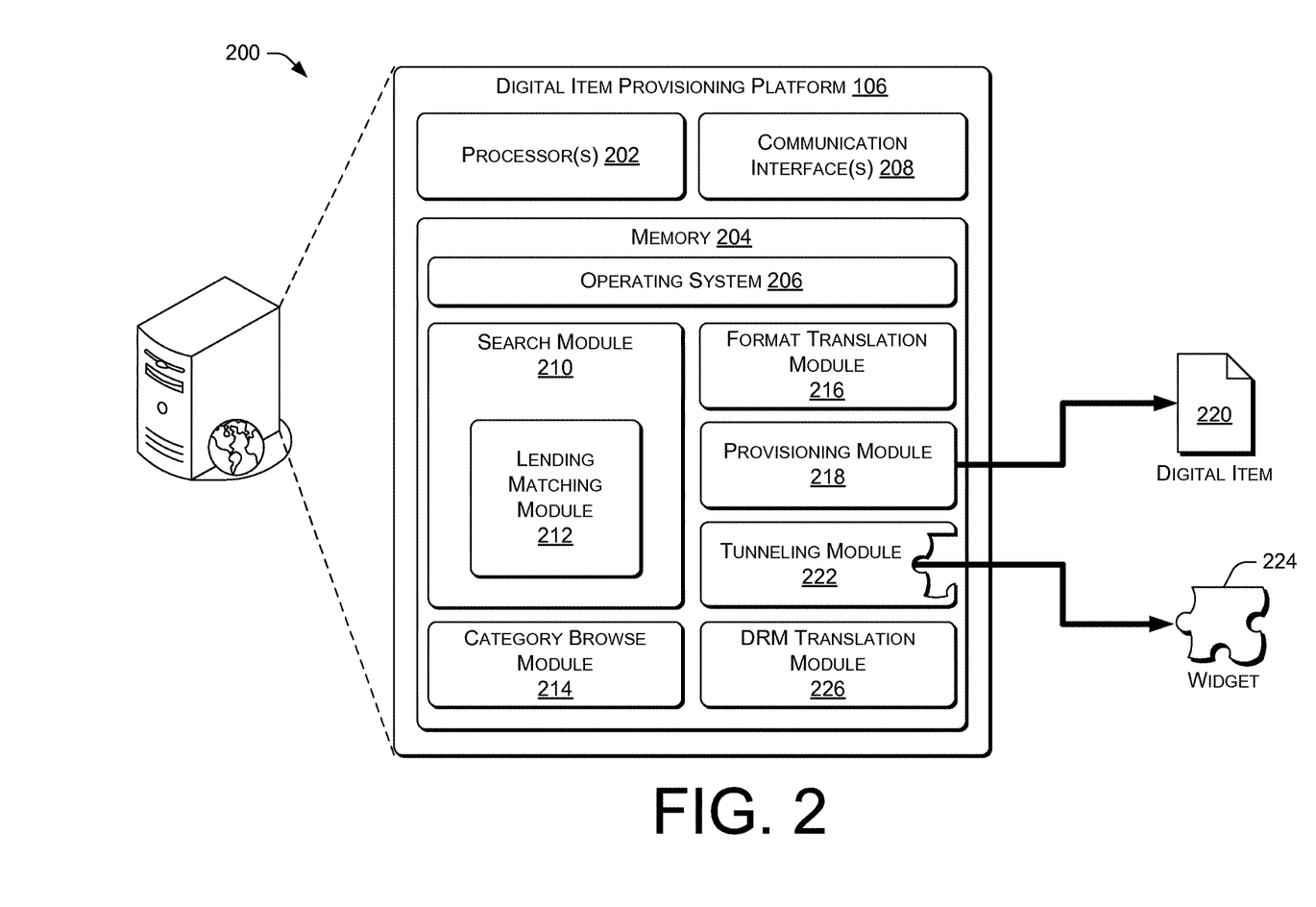
FIG. 2 is a block diagram illustrating selected modules of the digital item provisioning platform of FIG. 1.

FIG. 2 is a schematic block diagram 200 showing illustrative modules that may be included in the digital item provisioning platform 106 of FIG. 1. In a basic configuration, the digital item provisioning platform 106 includes one or more processors 202 and a memory 204.

The memory 204 is an example of a computer-readable storage medium and may include volatile and nonvolatile memory and/or removable and non-removable media implemented in any type or technology for storage of information, such as computer-readable instructions, data structures, program modules, or other data. Such memory includes, but is not limited to, RAM, ROM, EEPROM, flash memory, CD-ROM, digital versatile disks (DVD), or other optical storage, magnetic cassettes, magnetic tape, magnetic disk storage or other magnetic storage devices, RAID storage systems or any other tangible medium which can be used to store the desired information and which can be accessed by a computing device. In some implementations, the memory 204 may store an operating system 206 for controlling operation of the digital item provisioning platform 106.

The digital item provisioning platform 106 may also include one or more communication interfaces 208 to facilitate communication with external, remote computing sources such as the user devices 104 and the network 122. The communication interface(s) 208 support both wired and wireless connection to various networks, such as cellular networks, radio, Wi-Fi networks, short range networks (e.g., Bluetooth), infrared (IR), and so forth. The communication interface(s) 208 are one example of communication media. Communication media may typically be embodied by computer readable instructions, data structures, program modules, or other data in a modulated data signal, such as a carrier wave or other transport mechanism. Communication media is to be distinguished from computer-readable storage media.

A search module 210 stored in the memory 206 may implement searches across a lender community, a digital item library of which the user is a member, a digital item rental service, a digital item store, or the like. The search module 210 may identify one or more copies of a digital item available for consumption in response to a query from a user of a user device. The search module 210 may receive and aggregate information about the availability of digital content items from multiple sources by communicating with the multiple sources using established protocols such as a shared application programming interface (API). In some implementations, the search module 210 may also automatically provide user login information so that the user can receive search results from membership libraries, lender communities, and other sources of digital content items that require user authentication.

The search module 210 provides a low-friction portal for the user to identify digital items that are available for consumption. The search module 210 may employ map reduce technology to efficiently search through multiple sources of digital items. The user may receive a list of different copies of the same digital item that he or she may obtain or the search module 210 may identify only one copy (e.g., the least expensive copy) to the user. An ordering of the list of different copies presented to the user or selection of the single copy presented to the user may be based cost comparison and/or comparison of service quality between the multiple sources for the digital item.

A lending matching module 212 may also be included within the search module 210. Although users participating in lending to one another may receive a copy of a borrowed digital item directly from the digital item provisioning platform 106, the borrowed digital item may be associated with the lending user. Establishing a connection between the lent digital item and the lending user may assist in maintaining the metaphor that the users are lending to one another even though actual data transfer may occur between the respective users and the digital item provisioning platform 106 not between the users themselves.

The lending matching module 212 may support both two-user direct match search and more complex multi-user exchanges of digital items. The lending matching module 212 may employ map reduce or similar technology for solving distributable problems using a large number of computers. The lending matching module 212 may also access social networks that the user has joined and use social network graph search algorithms to identify potential lending partners among other things. Use of these and other searching algorithms allow the system to identify other users who have digital items each would like to borrow in exchange for lending another digital item.

A category browse module 214 provides the user another way to identify a digital item. Digital items may be organized into multiple categories including supercategories and subcategories with other digital items that have similar characteristics (e.g., genre, subject, author, format, publication date, and the like). In some implementations, the categories may be presented to the user on a dashboard user interface that allows the user to navigate through various browse nodes to identify a specific digital item. Thus, digital items may be identified by search and/or browsing categories as well as through other techniques.

A format translation module 216 may receive an indication of compatible formats for a user device when the user accesses the digital item provisioning platform 106 with his or her device. When a digital item desired by the user is found, but it is in a format that is not compatible with the user's digital item consumption device, the format translation module 216 may change the format of the digital item into a compatible format. Agreements from rights holders in the respective digital items may be obtained to authorize transforming or translating a digital item from one format into another. By providing access to digital items without regard to format, a user of a Kindle® may be able to borrow an eBook from a user of a Nook®. Similarly, a user than has a PlayStation® 3 may rent a video game for an X-Box 360®.

A provisioning module 218 may provide the digital item 220 in a format that is compatible with the user's device. The provisioning module 218 may push a copy of the digital item 220 to the user's device or inform the user that the digital item 220 is available for downloading from the digital item provisioning platform 106. In other implementations, the provisioning module 218 may also maintain the copy of the digital item in the memory 206 and provide streaming access to the user's device.

A tunneling module 222 may append a widget 224 to the digital item 220 when the digital item 220 is provided to the user device. Functionalities may vary between user devices, but providing software represented by the widget 224 can provide additional, specified functionality to those devices that are lacking a given function or lacking a protocol to communicate regarding a specific functionality with the digital item provisioning platform 106. Accordingly, widget 224 can be referred to herein as a "functionality widget." The tunneling module 222 will implant the widget 224 in a recipient user device while sending the digital item 220. Different user devices may have different digital formats, so tunneling technology may be employed to implant the widget 224. Specified functionalities added to user devices by widgets 224 may include the ability to perform instant messaging, gather users' annotations and bookmarks, allow users to leave comments or reviews, and other functionalities. The use of tunneling technology and pluggable widgets 224 may enable scalable support for different functions, including functions not envisioned at the time of creating a specific digital item consumption device, to be built in to a user device.

A DRM translation module 226 for translating DRM restrictions may also be included in the memory 204. The digital item provisioning platform 106 may support digital rights management in cooperation with content producers and rights holders. The DRM translation module 226 may receive an indication of DRM restrictions associated with the digital item 220. If the copy of the digital item identified by the search module 210 has DRM restrictions applied with a format or schema that is not compatible with the user's device, the DRM translation module 226 may apply equivalent DRM restrictions to the digital item 220 in a format that is compatible with the user's device.

Figure 3:
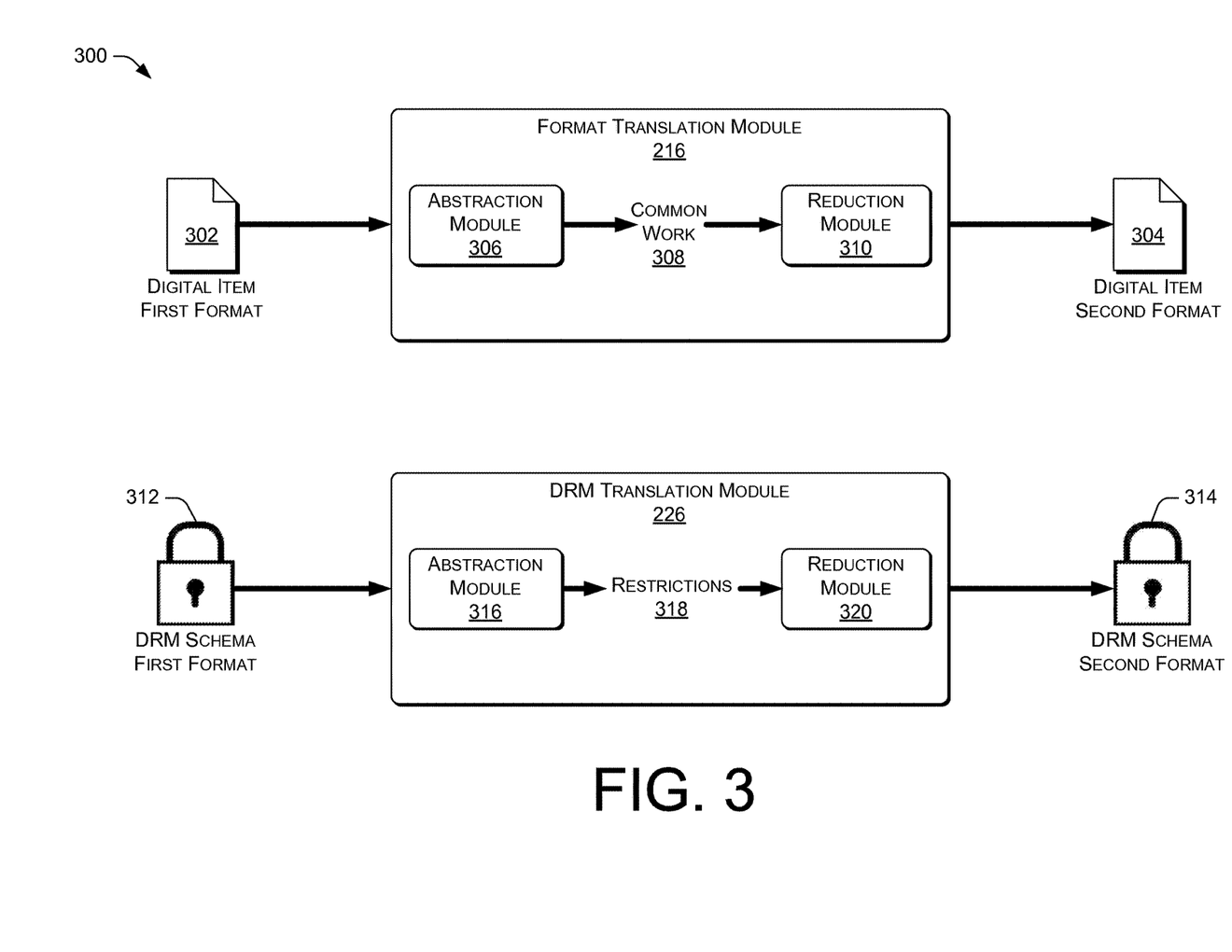
FIG. 3 shows the format translation module and the DRM translation module of FIG. 2 in greater detail.

FIG. 3 shows the format translation module 216 and the DRM translation module 226 of FIG. 2 in greater detail. The format translation module 216 converts a digital item in a first format 302 into a digital item in a second format 304. For example, the format translation module 216 may convert an audio file from windows media audio (WMA) to MP3 format. The format translation module 216 may directly modify the data representing the digital item in the first format 302 into data that represent the digital item in the second format 304.

In other implementations, the format translation module 216 may include an abstraction module 306 that generalizes the digital item in the first format 302 to a common work 308. The common work 308 can be represented as the digital item in a generic format such as representing an eBook as an ASCII text file. The abstraction module 306 may also identify an item number or other unique identifier (e.g., international standard book number (ISBN) for a book) that corresponds to the common work 308 represented by the digital item in the first format 302.

A reduction module 310 may reduce the common work 308 to a specific format represented by the digital item in the second format 304. In some implementations, the reduction module 310 may supply specific formatting to a file in a different format such as converting an ASCII text file to Adobe® portable document format (PDF) file with specific font, page layout, and the like. The reduction module 310 may also obtain a copy of the common work 308 in a specific format once the identity of the common work 308 (i.e., identification of that work's unique identifier) is determined by the abstraction module 306. For example, the abstraction module 306 may determine that the digital item in the first format 302 is the movie "The Sound of Music" in Apple® QuickTime™. The common work 308 is the movie "The Sound of Music." The reduction module 310 may then obtain that same movie in a different format such as a Moving Pictures Experts Group (MPEG) format so that the digital item in the second format 304 is available to the user's device in a compatible format (e.g., MPEG).

The DRM translation module 226 may convert a DRM schema in a first format 312 into a DRM schema in a second format 314. An abstraction module 316 within the DRM translation module 226 may analyze the DRM schema in the first format 312 to identify the functional restrictions 318 applied to a digital item. For example, specific DRM restrictions may include a limit on the number of times that the digital item may be lent and/or prohibitions on copying the digital item. A reduction module 320 may represent the same restrictions 318 in a different DRM format that is compatible with the user's device. Thus, the DRM schema in the second format 314 may include identical restrictions 318 (e.g. lend only two times, copy only once) as were specified by the DRM schema in the first format 312.

Figure 4:
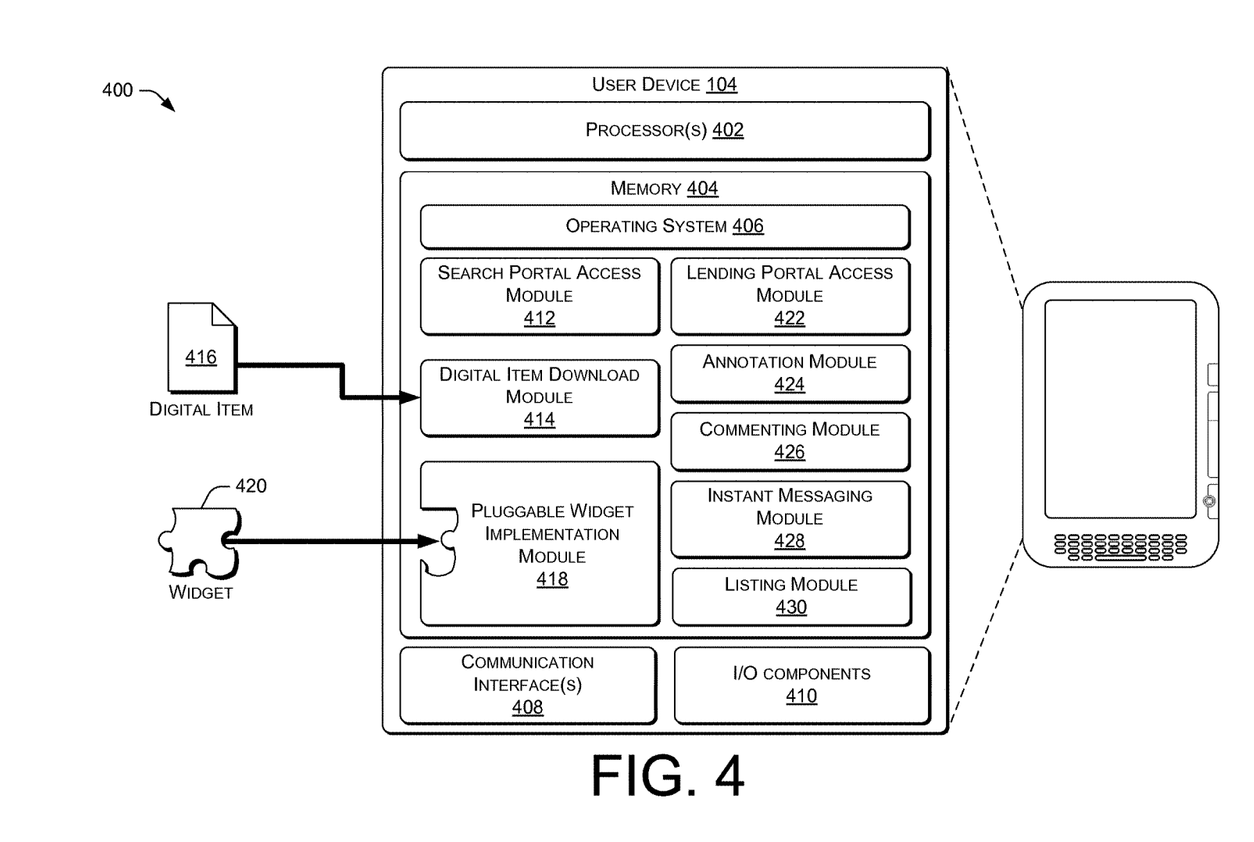
FIG. 4 is a block diagram illustrating selected modules of the user devices of FIG. 1.

FIG. 4 is a schematic block diagram 400 showing selected modules in a representative user device 104 that may be used to consume digital items, as described above with respect to FIG. 1. The user device 104 may represent any of the user devices 104(1)-(N) shown in FIG. 1. In a basic configuration, the user device 104 includes one or more processors 402 and a memory 404. The memory 404 may be an example of a computer-readable storage medium similar to the memory 204 shown in FIG. 2.

The user device 104 may also include one or more communication interfaces 408 to facilitate communication with external, remote computing sources such as the digital item provisioning platform 106 and the network 122. The communication interface(s) 408 may be similar to the communication interface(s) 208 shown in FIG. 2.

The user device 104 may further be equipped with various input/output (I/O) components 410. Such components may include various user interface controls (e.g., touch screen(s), buttons, mouse, keyboard, etc.), a display, audio speaker, a microphone or audio input, connection ports, and the like.

A search portal access module 412 may receive a search request for a digital item from a user of the user device 104 entered by one of the I/O components 410. The search portal access module 412 may communicate the search request to the search module 210 of the digital item provisioning platform 106. The search request may include an identifier of a digital item desired by the user, digital item format(s) compatible with the user device 104, and any DRM schema compatible with the user device 104. The search portal access module 412 may allow the user to obtain and browse search results. The search portal access module 412 may present a list of digital items available to the user on a user interface generated by an output component 410 of the user device 104.

A digital item download module 414 may receive a digital item 416 from the digital item provisioning platform 106. The digital item 416 may be a digital item identified in response to a search request generated by the search portal access module 412. In some implementations, the digital item 220 provided by the provisioning module 218 shown in FIG. 2 may be the same as the digital item 416 received by the digital item download module 414. In other implementations, the digital item 416 may be similar to the digital item in the second format 304 shown in FIG. 3. The digital item 416 may be in a format and have a DRM schema that is compatible with the user device 104.

The digital item download module 414 may also include a rental and purchase proxy that allows client-side (i.e., the user device 104) access to the searching module 210 of the digital item provisioning platform 106 so that the user may obtain digital items from rental services 112 and stores 114.

A pluggable widget implementation module 418 may implement a widget 420 received in conjunction with the digital item 416. The widget 420 received by the user device 104 may be the same as the widget 224 created by the digital item provisioning platform 106. The widget 420 may be executed by the processor(s) 402 in order to add additional functionality to the user device 104. In some implementations, the widgets 420 may be built into the digital item 416 during the translation performed by the format translation module 216. Tunneling technology may implant the widget 420 in the pluggable widget implementation module 418 to allow a user of the user device 104 to access different functionalities that may not be inherently available on the user device 104. The widget 420 may be used for a user to exchange instant messages with users of other user devices, gather the users' annotations and bookmarks related to the digital item 416, allow the user to leave comments or reviews of the digital item 416, or for other purposes.

A lending portal access module 422 may allow the user to create a list identifying his or her available digital items to lend out to the lending matching module 212 of the digital item provisioning platform 106. The lending portal access module 422 may also allow the user to create a borrowing list of digital items that he or she would like to borrow. Both lists may be sent from the user device 104 to the digital item provisioning platform 106. In some implementations, when a digital item that the user would like to borrow becomes available for loan from another user, the lending portal access module 422 may inform the user and request confirmation that the user still wishes to borrow the digital item. Similarly, when another user would like to borrow a digital item that the user has available to lend, the lending portal access module 422 may query the user and asked if he or she still wishes to lend the digital item. Thus, the lending portal access module 422 may communicate various digital item identifiers (e.g., item codes, ISBN identifiers) of digital items that the user wishes to both lend and borrow to the lending matching module 212 for matching at the digital item provisioning platform 106 and/or communication to a lending service 108.

In some implementations, the lending portal access module 422 may also facilitate communications between a lender and a borrower of a digital item. The two users associated with the digital item (i.e., the user that lent and the user that borrowed) can share comments and information about the respective experiences consuming the digital item.

An annotation module 424 may receive from the user an annotation to a digital item, associate the annotation with the user and with the digital item, and send the annotation in association with the digital item to an annotation storage such as the personal data storage 118 shown in FIG. 1. The annotation may also be associated with a specific passage or portion of the digital item (e.g., page 80 of an electronic book, time point 1:21 in an audio recording, and the like). The annotation module 424 may facilitate the recording and storage of annotations made to digital items. When a digital item is annotated by the user the annotations may remain linked to, but separate from, the copy of the digital item. Thus, when the digital item is lent to another user, returned to a rental service or library, etc., the annotations are not sent along with the copy of the digital item. However, if the user later accesses a same or different copy of the digital item, the annotation module 424 may automatically retrieve the annotations from the annotation storage and "re-associate" those annotations with the digital item. If a user device 104 lacks the annotation module 424, similar functionality may be provided by a widget 420 conferring annotation functionality on the user device 104.

A commenting module 426 may receive a comment related to the digital item from the user. The comment in module 426 may also associate the comment with the user (i.e., with a user ID) and with the digital item. In some implementations, association with the digital item may associate that comment with the common work that represents the digital item. Thus, other users accessing the same common work regardless of format or specific copies of the digital item may be able to access and view the comment. The comment may include a rating of the digital item (e.g., excellent-good-poor, 1-5 stars, etc.), thus the commenting module 426 can function as a rating module to collect ratings of digital items from the user of the user device 104. Comments received by the commenting module 426 may be sent via the communication interface(s) 408 to a comment storage such as the public data storage 120 shown in FIG. 1. Comments and reviews received by the commenting module 426 may also be available immediately through a live social network feed to other users that subscribe to a channel related to the feed. Thus, social networks can receive comments or reviews in substantially real time and make those comments and reviews available to other users that have expressed an interest or otherwise associate themselves with the digital item that is being reviewed or commented upon. If a user device 104 lacks the commenting module 426, similar functionality may be provided by a widget 420 conferring commenting functionality on the user device 104.

An instant messaging module 428 may create an instant message session with another computing device operated by another user. The instant message session may be a chat session in which two or more users exchange messages in substantially real time with each other. The messages may be text or in another format. Users participating in an instant message session may all be users that are consuming or have consumed the same digital item on the respective computing devices. For example, if the user of the user device 104 is reading the eBook "Travels with Charley: In Search of America," the instant messaging module 428 may allow the user to initiate a chat session with another user that is also reading the same eBook or a user that has previously read that eBook. A copy of a digital item may also store user identifiers for all of the users that previously possessed the digital item. Therefore, instant messaging may be initiated with any of the previous holders of a given digital item. The instant messaging module 428 may facilitate discussions between users that have connection to a common digital item such as members of a book club, fans of a band, student studying from the same textbook, etc. If a user device 104 lacks the instant messaging module 428, similar functionality may be provided by a widget 420 transferring instant messaging functionality.

A listing module 430 may enable the user to create lists for sending to another computing device such as the digital item provisioning platform 106. The list may include lists of digital items such as a wish list or a reading list. The wish list may indicate digital items that the user wishes to purchase or otherwise obtain his or her own copy. The listing module 430 may allow the user to add digital items that he or she is currently borrowing or renting to the wish list. The reading list may include a list of digital items that the user wishes to consume (i.e., audio and video items that are not "read" may also be included in the reading list). If the user searches for a digital item that is not available, the user may add it to the reading list. In some implementations, the listing module 430 may receive a notification when a digital item included in the reading list becomes available.

Illustrative Digital Item Lending

Figure 5:
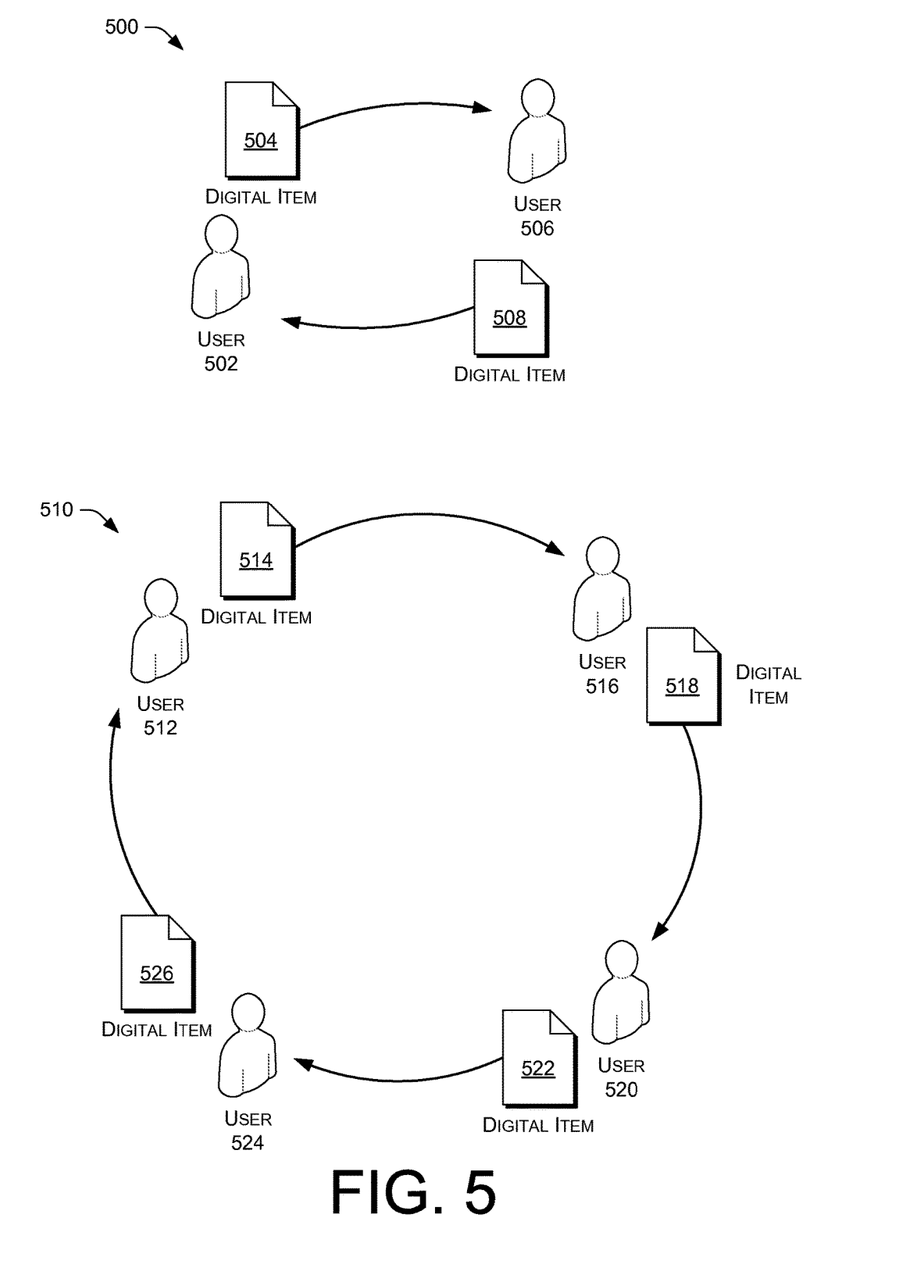
FIG. 5 illustrates exchanges of digital items amongst multiple users.

FIG. 5 shows examples of digital item lending between multiple users. Lending of digital items between multiple users may be mediated by the lending services 108 shown in FIG. 1. In some implementations, users may pay a subscription or membership fee to a lending service 108 in order to receive its assistance in mediating lending and borrowing of digital items. Unlike tangible items, digital items may be lent or borrowed from another user anywhere in the world in only of the amount of time that it takes to transfer a copy of the digital item over a network. Thus, the number of potential lending partners is much greater for digital items as is the need for a service to mediate and find matches between lenders and borrowers.

Individual users may access lending services through a lending portal access module 422 of their respective user devices 104 as shown in FIG. 4. In some implementations, the digital item provisioning platform 106 mediates interactions between individual users and a lending service 108 through the use of the lending matching module 212 shown in FIG. 2. By integrating the ability to coordinate and mediate lending services as well as other techniques for obtaining digital items, the digital item provisioning platform 106 can function as a single unified channel for obtaining access to digital items.

A diagram 500 illustrates a basic lending scenario. A user 502 has a digital item 504 that he or she is willing to lend to other users. This willingness may be communicated by user 502 through the lending portal access module 422 of his or her user device 104. The user 502 has also indicated one or more digital items that he or she wishes to borrow. Here, another user 506 has a second digital item 508. The other user 506 wishes to borrow the digital item 504 available from the user 502 and the other user 506 also has a digital item 508 that is desired by the user 502. Thus, the users 502 and 506 may swap digital items 504 and 508. In some implementations, borrowing wish lists of the respective users 502 and 506 may be compared, for example by the lending matching module 212, to identify a pair of digital items 504 and 508 that the users 502 and 506 can exchange.

Both the user 502 and a user 506 may indicate available dates of the digital items that they can lend out and delivery dates of when they wish to borrow desired digital items. The timing of the availability and desired borrowing dates may be considered when identifying a match between lenders and borrowers. The user lending his or her copy of a digital item may place restrictions on use of the item by the recipient such as prohibiting the recipient from subsequently lending to a third party, requiring the recipient to return the digital item after a defined period of time (e.g., two weeks), or another type of restriction.

However, there may be occasions in which the digital items that a user has available to loan are not desired by any of the other users with digital items that this giving user wishes to borrow. Therefore, swapping digital items between two users is not possible. Depending on the number of users that belong to a lending service 108, it may be possible to identify a combination of lending and borrowing transactions that allow each user to lend a digital item that he or she has available and borrow a digital item that he or she desires.

A diagram 510 illustrates lending and borrowing transactions between a group of four users. Here, user 512 has digital item 514 available to lend, but user 512 does not wish to borrow any of the digital items available from the user 516. User 516 receives the digital item 514 from user 512 and lends digital item 518 to user 520. In turn, user 520 lends digital item 522 to user 524 who lends digital item 526 back to the first user 512. Thus, each of the users 512, 516, 520, and 524 are able to obtain a digital item that he or she desires in exchange for lending a digital item that he or she has available to loan.

In some implementations, the lending portal access module 422 may inform the user 512 that he or she can receive the loan of the digital item 526 in exchange for lending the digital item 514. The user 512 may or may not be informed of the number or identity of other users (i.e., users 516, 520, and 524) involved in the digital item exchange. The lending activities may occur sequentially (e.g. user 512 first lends digital item 514, then user 516 lends digital item 518, and so on) or simultaneously. For example, each of the users 512, 516, 520, and 524 may be required to agree to the transaction before the lending matching module 212 implements the respective digital item loans.

The diagrams 500 and 510 both show lending/borrowing arrangements in which the respective users obtain access to a desired digital item. In some implementations, arrangements involving fewer users may be preferred to arrangements that involve a greater number of users. Thus, the lending matching module 212 may attempt to identify a combination of lending and borrowing transactions that satisfies the needs of all the users while also minimizing the number of users in any particular series of exchanges. A graph match algorithm may be used to identify lending transactions and to determine how to arrange lending transactions in order to minimize the number of users in each lending/borrowing group.

The lending interactions may be implemented so that the number of digital items lent equals the number of digital items borrowed as shown in the diagrams 500 and 510. However, in other implementations the number of digital items lent may be greater or lesser than the number of digital items borrowed. A difference in the number of digital items lent as compared to the number of digital items borrowed by a given user may be tracked using a lending metric or other accounting technique.

Illustrative Processes

The processes described below are illustrated as a collection of blocks in a logical flow graph, which represent a sequence of operations that can be implemented in hardware, software or a combination thereof. In the context of software, the blocks represent computer-executable instructions that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process.

Figure 6A:
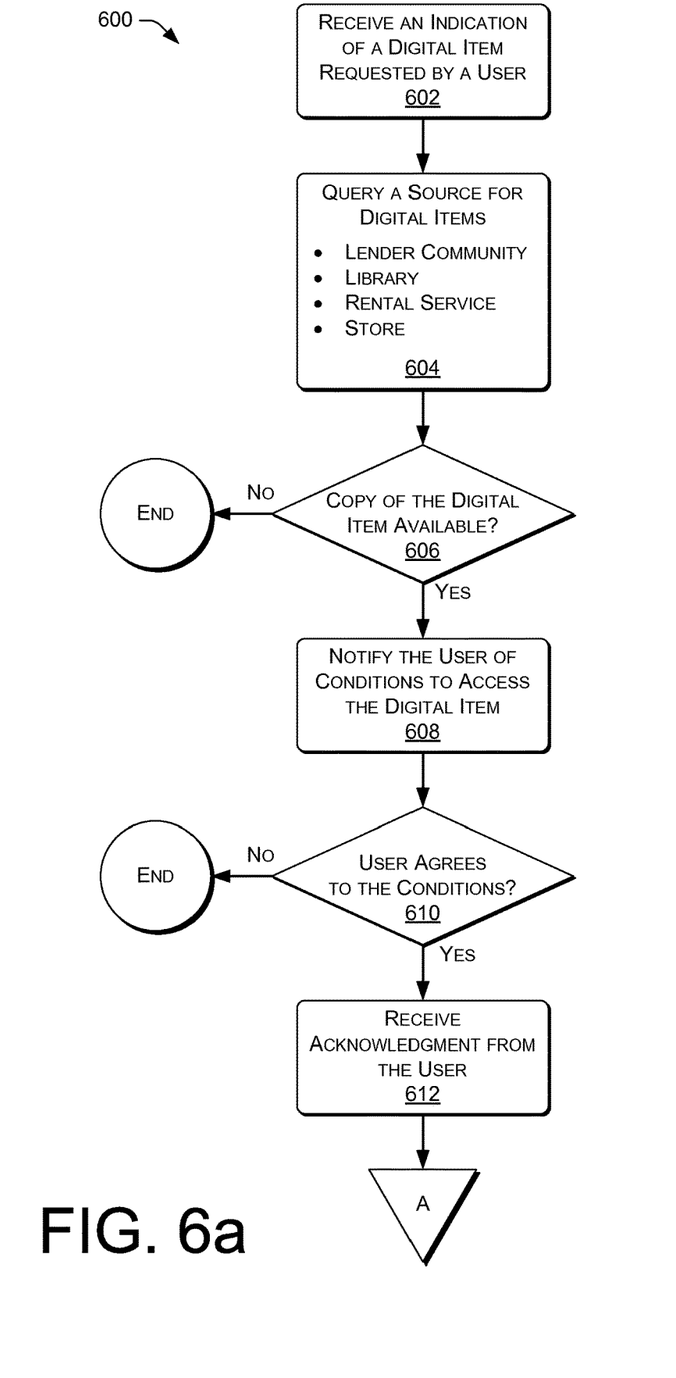
FIG. 6a is a flow diagram of an example process of providing a digital item to a user device.
Figure 6B:
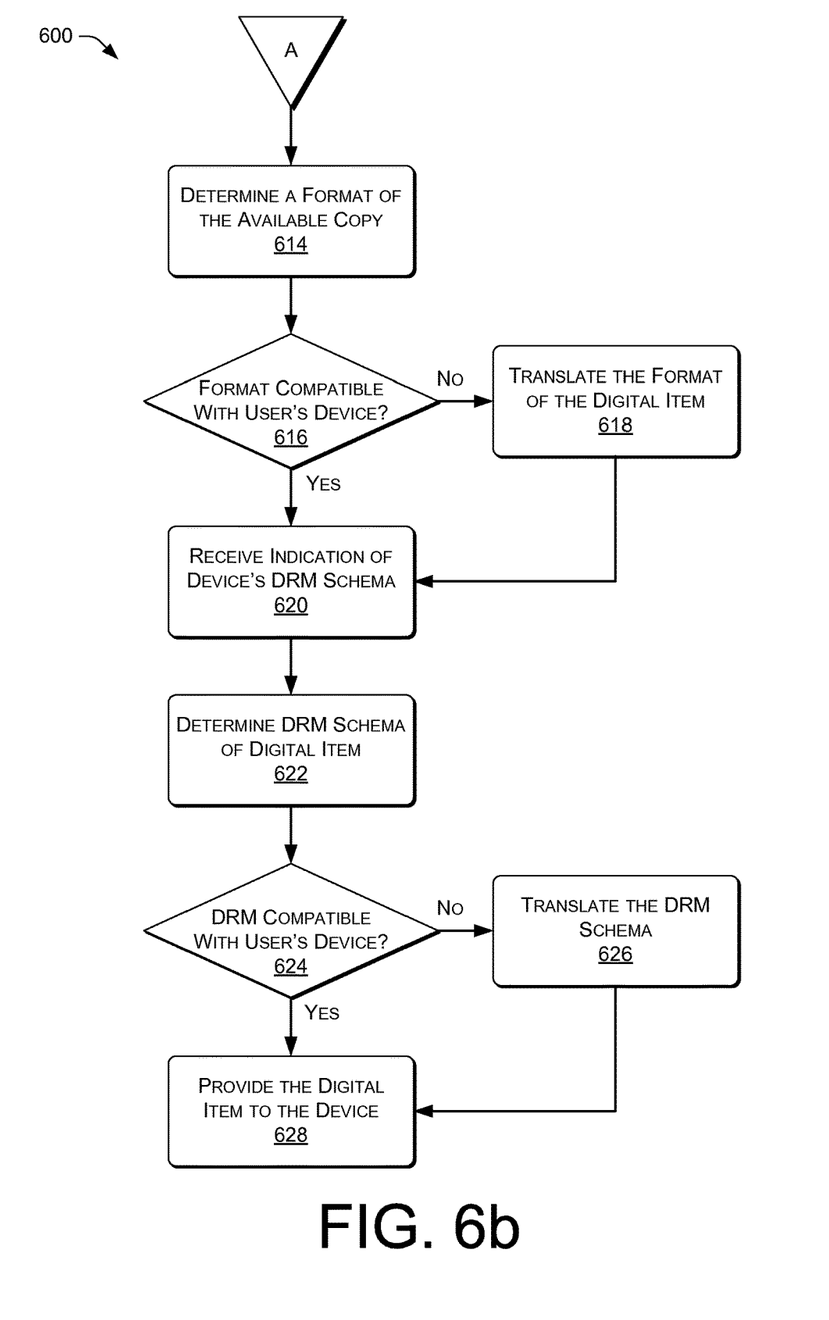

FIGS. 6a and 6b show a process 600 for providing a digital item to a user device in a format and with DRM restrictions that are compatible with the user device. The process 600 may be performed in all or part by components of the digital item provisioning platform 106 shown in FIGS. 1 and 2.

At 602, an indication of a digital item requested by a user and a digital item format compatible with a digital item consumption device of the user is received. The indication may be based on a list of digital items in a wish list of the user, a search query entered by the user, or the like. Identification of compatible formats may be provided automatically by the user's consumption device such as, for example, as data appended to a search query or wish list.

At 604, at least one of a lender community of other consumers of digital items, a digital item library of which the user is a member, a digital item rental service, and/or a digital item store is queried to find available copies of the digital item. In some implementations the lender community may be queried first and other sources of digital items queried only if a copy is not available through the lender community. There may also be a default or user-specified algorithm for querying the various sources of digital items. For example, one such algorithm may be to query the lender community first, if no results query the library second, if no results from the library then query the rental services third, and finally if none of the other sources have the digital item, query the digital item stores.

At 606, it is determined if results from the querying at 604 identify at least one copy of the digital item available for consumption by the user. If a copy of the digital item is not identified as available from any of the sources queried at 604, process 600 proceeds along the "no" path and the user may be informed that there are no available copies at the present time. If there is no matching item for the user's query, the user may be presented with options to obtain similar digital items (e.g., earlier editions, similar titles, same author, similar reviews, similar genre, etc.) that are available.

If a copy of the digital item is available, process 600 proceeds along the "yes" path to 608. When more than one copy of the digital item is available for consumption by the user, a copy of the digital item that is available for at the lowest cost as compared to other available copies of the digital item may be identified.

At 608, the user is notified of availability of the digital item and conditions associated with obtaining access to consume the digital item. If a lowest cost digital item was identified at 606, the user may be notified only of the lowest cost digital item or may be notified which of multiple copies is accessible at the lowest cost. The conditions may include a requirement to lend a digital item from the user's collection in order to borrow the digital item (e.g., if the digital item is located through a lending service). The conditions may also include the length of a loan from a library, a cost to rent, or a cost to purchase a copy of the digital item.

At 610, it is determined if acknowledgment of the conditions is received from the user. If the user does not agree to the conditions, the process 600 proceeds along the "no" path and the user does not obtain access to the digital item. If the user agrees to the conditions, the process 600 proceeds along the "yes" path to 612.

At 612, acknowledgment from the user of agreement to the conditions is received. The user may transmit the acknowledgment from the user device that will also be used to consume the digital item.

At 614, shown on FIG. 6b, a format of the copy of the digital item is determined. A list of formats compatible with the user device of the user may be stored by the digital item provisioning platform 106 in association with an account of the user. Additionally or alternatively, communications from the user device (e.g., search queries for specific digital items) may include indications of compatible formats through metadata, tags, watermarks, or other techniques.

At 616, it is determined if the format is compatible with the digital item consumption device of the user. When the format of the digital item is a format other than a format compatible with the digital item consumption device of the user, the process 600 proceeds along the "no" path to 618. If the format of the digital item is compatible with the digital item consumption device, the process 600 proceeds along the "yes" path to 620.

At 618, the digital item is translated into a format compatible with the digital item consumption device of the user. The translation may be implemented by the format translation module 216 using techniques such as those discussed in conjunction with FIG. 3.

At 620, an indication of a DRM schema compatible with the digital item consumption device of the user is received. A list of DRM schema compatible with the user device of the user may be stored by the digital item provisioning platform 106 in association with an account of the user. Additionally or alternatively, communications from the user device (e.g., search queries for specific digital items) may include indications of compatible DRM schema through metadata, tags, watermarks, or other techniques.

At 622, a DRM schema of the copy of the digital item is determined. The DRM schema of the copy of the digital item may be identified by data included in the digital item such as metadata or a DRM code.

At 624, it is determined if the DRM schema of the copy of the digital item is compatible with the digital item consumption device of the user. When the DRM schema of the copy of the digital item is incompatible with the digital item consumption device of the user, the process 600 proceeds along the "no" path to 626. If the DRM schema of the copy of the digital item is compatible with the digital item consumption device of the user, the process 600 proceeds along the "yes" path to 628.

At 626, the DRM schema of the digital item is translated into a DRM schema that is compatible with the digital item consumption device of the user. The translation may be implemented by the DRM translation module 226 using techniques similar to those discussed with respect to FIG. 3.

At 628, the digital item in the format compatible with the digital item consumption device of the user and with a compatible DRM schema is provided to the digital item consumption device of the user. In some implementations, the digital item may be provided by the provisioning module 218 of the digital item provisioning platform 106 to the digital item download module 414 of the user device 104.

Figure 7:
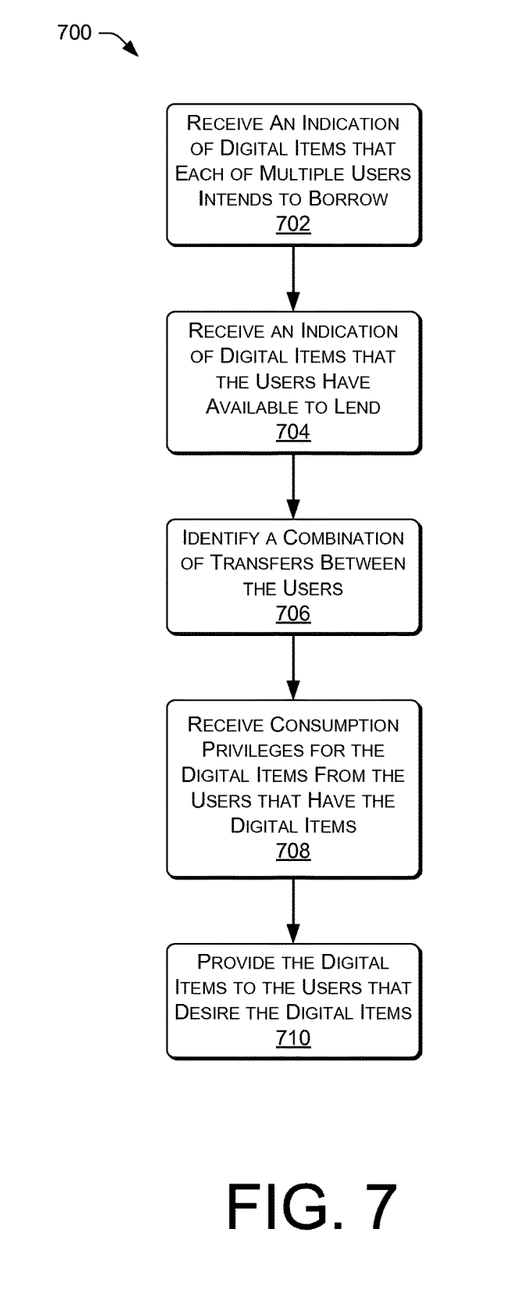
FIG. 7 is a flow diagram of an example process of identifying a group of users to exchange digital items with each other.

FIG. 7 shows a process 700 of identifying multiple users that can transfer digital items betweens themselves so that each of the multiple users are able to borrow a desired digital item from another of the multiple users. Process 700 may be performed in all or part by a component of the digital item provisioning platform 106 such as the lending matching module 212 shown in FIG. 2.

At 702, indications from a plurality of users of one or more digital items that each of the users respectively indicates and intention to borrow are received. The indications may be received as a search query or as a wish list from a user.

At 704, indications from each of the plurality of users of one or more digital items that each of the users respectively has available to lend are received. The users may provide a list of digital items that they are willing to lend together with dates that they are willing to make those digital items available to others through the lending portal access modules 422 of their respective user devices 104.

At 706, a combination of digital item transfers that results in at least a portion of the plurality of users receiving one of the digital items that each respective user has indicated an intention to borrow and lending one of the digital items that each has available to lend are identified. There may be some of the plurality of users for which lending/borrowing exchanges are not identified (e.g., users that have only unpopular digital items to lend). Thus, in some cases only a portion of the plurality users may be matched with corresponding lenders. In some instances, the portion of the plurality of users may include two users so that the users simply exchange digital items with each other. In other instances, the portion of the plurality of users may be more than two users resulting in multiple lending and borrowing transactions between at least three users so that all the users are able to borrow a desired digital item.

In some implementations a graph search algorithm may be used to search across the plurality of users in order to identify a combination of transfers that allow some subset of the users to lend a digital item and receive the loan of another digital item desired by the borrowing user. The identifying may also include (e.g., due to specific configuration of the graph search algorithm) identifying a combination of digital item transfers that minimizes a number users in the portion of the plurality of users. For example, a swap between two users may be preferred over exchanges amongst three users, the exchange between three users may be preferred over transfers between four users, and so forth.

At 708, consumption privileges for each of the digital items identified in the combination from the respective users that have the digital items available to lend are received. Receiving consumption privileges may include downloading a copy of the digital item for consumption to a user device. In other implementations, receiving consumption privileges may include receiving a token or authorization code to access the digital item in a cloud-based storage system or receiving a stream of the digital item.

In some implementations, receiving consumption privileges by the borrowing user may prevent the lending user from consuming the digital item while it is out on loan. Thus, the loan is associated with a cost to the lending user (i.e., he or she cannot consume the digital item while loaned to another) similar to lending a copy of a tangible content item. Although data representing the digital item may be copied and present on the user devices of both the lending and borrowing users, DRM or another technique may block the lending user from consuming that data when the digital item is on loan to another.

At 710, a copy of each of the digital items is provided to the respective users that desire to borrow the digital items in response to receiving the consumption privileges at 708. In some implementations, the copy of the digital items provided to the multiple users may be transformed into formats compatible with digital item consumption devices respectively used by each of the portion of the plurality of users. The translation may be performed by the format translation module 216 as shown in FIG. 3.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system for accessing digital content items across multiple formats, the computing system comprising:
   one or more processors;
   memory accessible by the one or more processors;
   one or more modules maintained in the memory, which when executed by the one or more processors:
      identify a first digital content item from a lender community having digital content items indicated as available for borrowing responsive to a query associated with a user device, the first digital content item having a first format that is incompatible with the user device;
      generate a second digital content item based at least in part on the first digital content item, the second digital content item being in a second format that is compatible with the user device;
      append to the second digital content item a widget providing messaging functionality that the user device previously lacked, the messaging functionality between the user device and another user device; and
      send the second digital content item and the widget to the user device.

2. The computing system of claim 1, wherein the first digital content item and the second digital content item comprise an electronic book and the user device comprises a dedicated electronic book reader.

3. The computing system of claim 1, wherein the one or more modules are further executed to search across at least one of a digital content item library, a digital content item rental service, or a digital content item store.

4. The computing system of claim 1, wherein the one or more modules are further executed to receive an indication of DRM restrictions in a first DRM format associated with the first digital content item and apply the DRM restrictions in a second DRM format to the second digital content item.

5. The computing system of claim 1, further comprising a personal data storage that is configured to store an annotation associated with a user account and with a specified portion of the second digital content item.

6. The computing system of claim 1, further comprising a public data storage configured to store a comment that relates to the second digital content item and that has access permissions received from the user device.

7. The computing system of claim 1, wherein the widget further includes instructions executable by the user device to:
   collect an annotation to the second digital content item that is associated with a specified portion of the second digital content item, or
   collect a review of the second digital content item.

8. The computing system of claim 1, wherein the query associated with the user device is received from a user interface on the user device and the user interface is configured to present multiple browsing categories to identify the second digital content item.

9. A computing device comprising:
one or more processors;
memory accessible by the one or more processors;
a search module stored in the memory, which when executed by the one or more processors, identifies a first digital content item from a lender community responsive to a query associated with a user device, the first digital content item having a first format that is incompatible with the user device;
a format translation module stored in the memory, which when executed by the one or more processors, generates a second digital content item based at least in part on the first digital content item, the second digital content item being in a second format that is compatible with the user device;
a tunneling module stored in the memory, which when executed by the one or more processors, appends a widget to the second digital content item, wherein the widget provides functionality that the user device previously lacked to collect a comment related to the second digital content item; and
a provisioning module stored in the memory, which when executed by the one or more processors, provides the second digital content item in the second format and the widget to the user device.

10. The computing device as recited in claim 9, wherein the widget further provides specific functionality to:
enable messaging between the user device and another user device; or
collect an annotation to the second digital content item that is associated with a specified portion of the second digital content item.

11. The computing device as recited in claim 9, wherein the search module further searches across at least one of a lender community having digital content items indicated as available for borrowing, a digital content item library, a digital content item rental service, or a digital content item store.

12. The computing device as recited in claim 9, further comprising a digital rights management (DRM) translation module stored in the memory, which when executed by the one or more processors, receives an indication of DRM restrictions in a first DRM format associated with the first digital content item in the first format and applies the DRM restrictions in a second DRM format to the second digital content item in the second format.

13. The computing device as recited in claim 9, further comprising a personal store that stores an annotation associated with the user device and with a specified portion of the second digital content item.

14. The computing device as recited in claim 9, further comprising a public store in the memory for storing a comment generated by the user device, the comment relating to the second digital content item and having one or more access permissions specified by the user device.

15. A computer-implemented method comprising:
under control of one or more processors configured with specific executable instructions,
identifying a first digital content item from a lender community responsive to a query associated with a user device, the first digital content item having a first format that is incompatible with the user device;
generating a second digital content item based at least in part on the first digital content item, the second digital content item being in a second format that is compatible with the user device;
appending a widget to the second digital content item, wherein the widget provides a messaging functionality that the user device previously lacked, the messaging functionality between the user device and another user device; and
sending the second digital content item and the widget to the user device.

16. The computer-implemented method as recited in claim 15, wherein the widget further includes instructions executable by the user device to:
collect an annotation to the second digital content item that is associated with a specified portion of the second digital content item, or
collect an annotation related to the second digital content item.

17. The computer-implemented method as recited in claim 15, further comprising:
receiving an indication of one or more digital rights management (DRM) restrictions associated with the first digital content item in the first format; and
applying the DRM restriction to the second digital content item in the second format.

18. The computer-implemented method as recited in claim 15, further comprising receiving an identifier of one or more digital content items that the lender community makes available for lending.

* * * * *